(12) United States Patent
Ziegmann

(10) Patent No.: US 8,371,062 B2
(45) Date of Patent: Feb. 12, 2013

(54) RACCOON TRAP

(76) Inventor: Neil Ziegmann, Lake View, IA (US)

( * ) Notice: Subject to any disclaimer, the term of this patent is extended or adjusted under 35 U.S.C. 154(b) by 0 days.

(21) Appl. No.: 13/434,131

(22) Filed: Mar. 29, 2012

(65) Prior Publication Data

US 2012/0180377 A1 Jul. 19, 2012

Related U.S. Application Data

(62) Division of application No. 12/773,303, filed on May 4, 2010, now Pat. No. 8,230,642.

(60) Provisional application No. 61/175,068, filed on May 4, 2009.

(51) Int. Cl.
*A01M 23/00* (2006.01)

(52) U.S. Cl. ..................... 43/61; 43/81; 43/85

(58) Field of Classification Search ............. 43/85–96, 43/58, 61, 77, 81
See application file for complete search history.

(56) References Cited

U.S. PATENT DOCUMENTS

| | | | |
|---|---|---|---|
| 384,415 A | 6/1888 | Beach | |
| 1,309,036 A * | 7/1919 | Knight | 43/96 |
| 1,384,890 A * | 7/1921 | Gilmore | 43/81 |
| 2,720,050 A * | 10/1955 | Pfeiffer | 43/96 |
| 4,158,929 A | 6/1979 | Custard | |
| 4,308,683 A * | 1/1982 | Lee | 43/96 |
| 4,341,033 A | 7/1982 | Siegel | |
| 4,601,128 A | 7/1986 | Danison | |
| 4,633,610 A | 1/1987 | Thompson | |
| 4,802,301 A | 2/1989 | Isborn et al. | |
| 6,164,010 A * | 12/2000 | Snell et al. | 43/131 |
| 6,658,787 B1 | 12/2003 | Bonnot | |
| 7,249,910 B2 * | 7/2007 | Eckert et al. | 404/10 |
| 7,631,447 B2 * | 12/2009 | Morton et al. | 40/607.05 |
| 2005/0274057 A1 | 12/2005 | McCulloch | |
| 2011/0289821 A1 * | 12/2011 | Bonnot | 43/86 |
| 2012/0060405 A1 * | 3/2012 | Stephens | 43/85 |

* cited by examiner

*Primary Examiner* — Darren W Ark
*Assistant Examiner* — Kathleen Iwasaki
(74) *Attorney, Agent, or Firm* — McKee, Voorhees & Sease, P.L.C.

(57) ABSTRACT

The animal trap of the present invention includes a tubular body with an open forward end and a closed rear end. A spring loaded restraint is pivotally mounted on the body so as to be movable between open and closed positions. A latch on the body engages the restraint to set the restraint in the open position. A trigger on the body engages the latch to set the trap. The trigger is movable in opposite forward and rearward directions by an animal, such as a raccoon, reaching its paw into the housing and pushing or pulling the trigger leg, such that the latch is disengaged and releases the restraint, which is forced by a spring to the closed position to catch the animal's paw in the tubular body.

19 Claims, 7 Drawing Sheets

US 8,371,062 B2

RACCOON TRAP

CROSS-REFERENCE TO RELATED APPLICATIONS

This application is a Divisional Application of U.S. Ser. No. 12/773,303 filed May 4, 2010, which claims priority under 35 U.S.C. §119 of a provisional application Ser. No. 61/175,068 filed May 4, 2009, which applications are hereby incorporated by reference in their entirety.

BACKGROUND OF THE INVENTION

Various types of traps have been commercially available for many years for use by fur trappers, such as raccoon traps. One of the most common types of raccoon traps includes a tubular body in which bait is inserted, with a trigger which is set and then tripped by a raccoon's paw when the raccoon tries to withdraw the bait from the tubular body. The trigger is tripped only in one direction, when the paw is being pulled out of the tubular housing. For example, see U.S. Pat. No. 6,658,787 (Bonnot) for a spring-loaded trap with a one-way trigger. When the trigger is tripped, a spring biased clamp traps the raccoon's leg before the paw is withdrawn from the housing. This type of trap is more humane to the animal, and causes little or no injury to the animal. However, some raccoons escape the trap without setting off the trigger, due to the one-way action of the trigger. Also, the wire loop anchor of the Bonnot trap cannot be pushed into hard or frozen ground, and cannot be anchored in a tree, wooden post or other solid structure. The Bonnot trap also cannot be used in water since the anchor is too short.

Therefore, a primary objective of the present invention is the provision of an improved animal trap having a trigger which can be released in two, opposite directions.

Another objective of the present invention is the provision of an improved raccoon trap which can be triggered by the raccoon's paw reaching into the trap and being withdrawn from the trap.

A further objective of the present invention is the provision of an animal trap which can be tripped by the animal's paw pushing or pulling against the trap trigger.

Yet another objective of the present invention is the provision of an improved animal trip which is safe to set and effective in use.

Still another objective of the present invention is the provision of an improved animal trap which humanely traps the animal's paw.

Another objective of the present invention is the provision of an improved animal trap which can be quickly and easily staked to hard or frozen ground or a wooden structure.

Another objective of the present invention is the provision of an improved animal trap having a ground stake and a non-tangling anchoring chain.

A further objective of the present invention is the provision of an improved raccoon trap which is economical to manufacture and durable in use.

These and other objectives will become apparent from the following description of the invention.

DESCRIPTION OF THE PREFERRED EMBODIMENT

Figure 4:
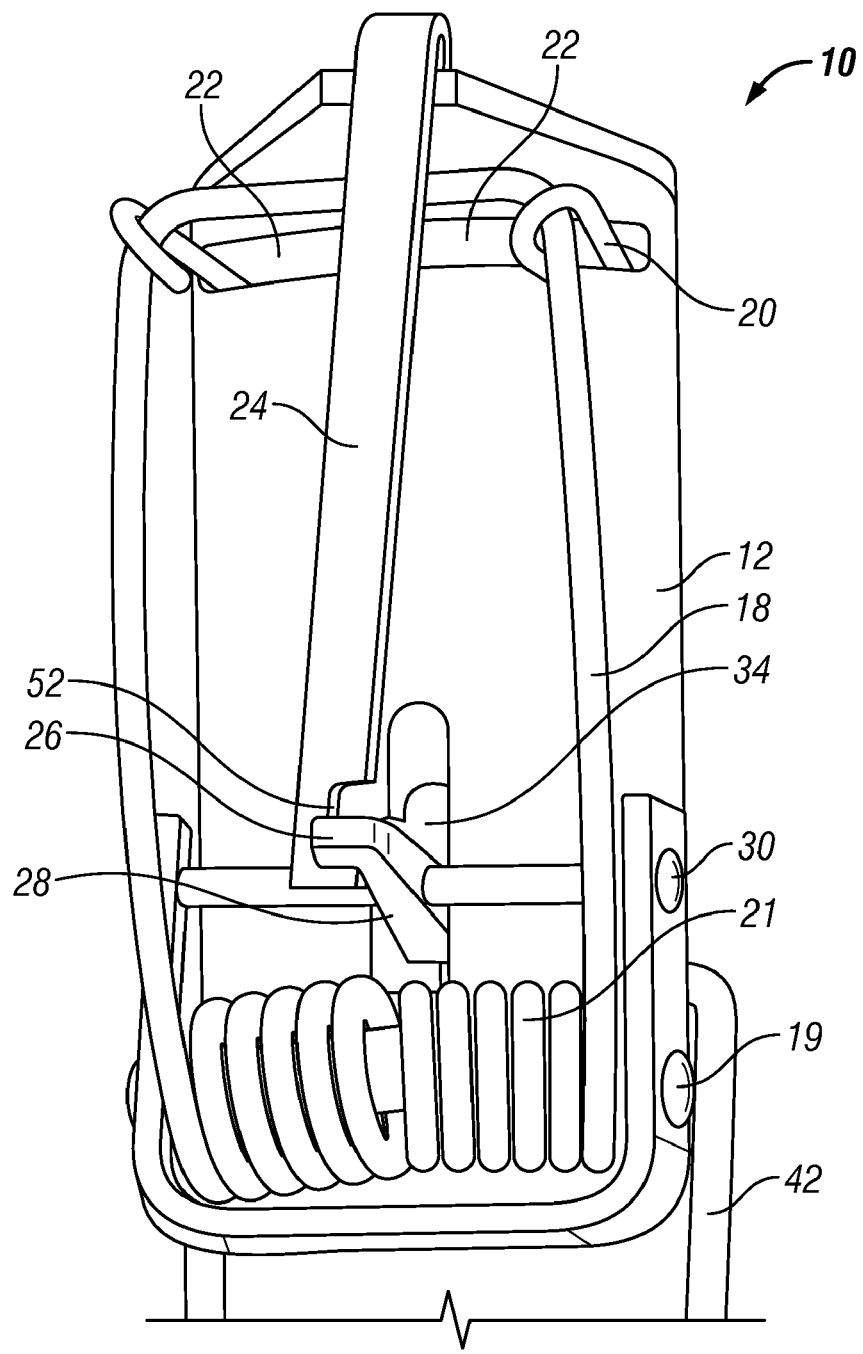
FIG. 4 is an enlarged view showing the trap trigger and latch of the trap in a set condition.
Figure 5:
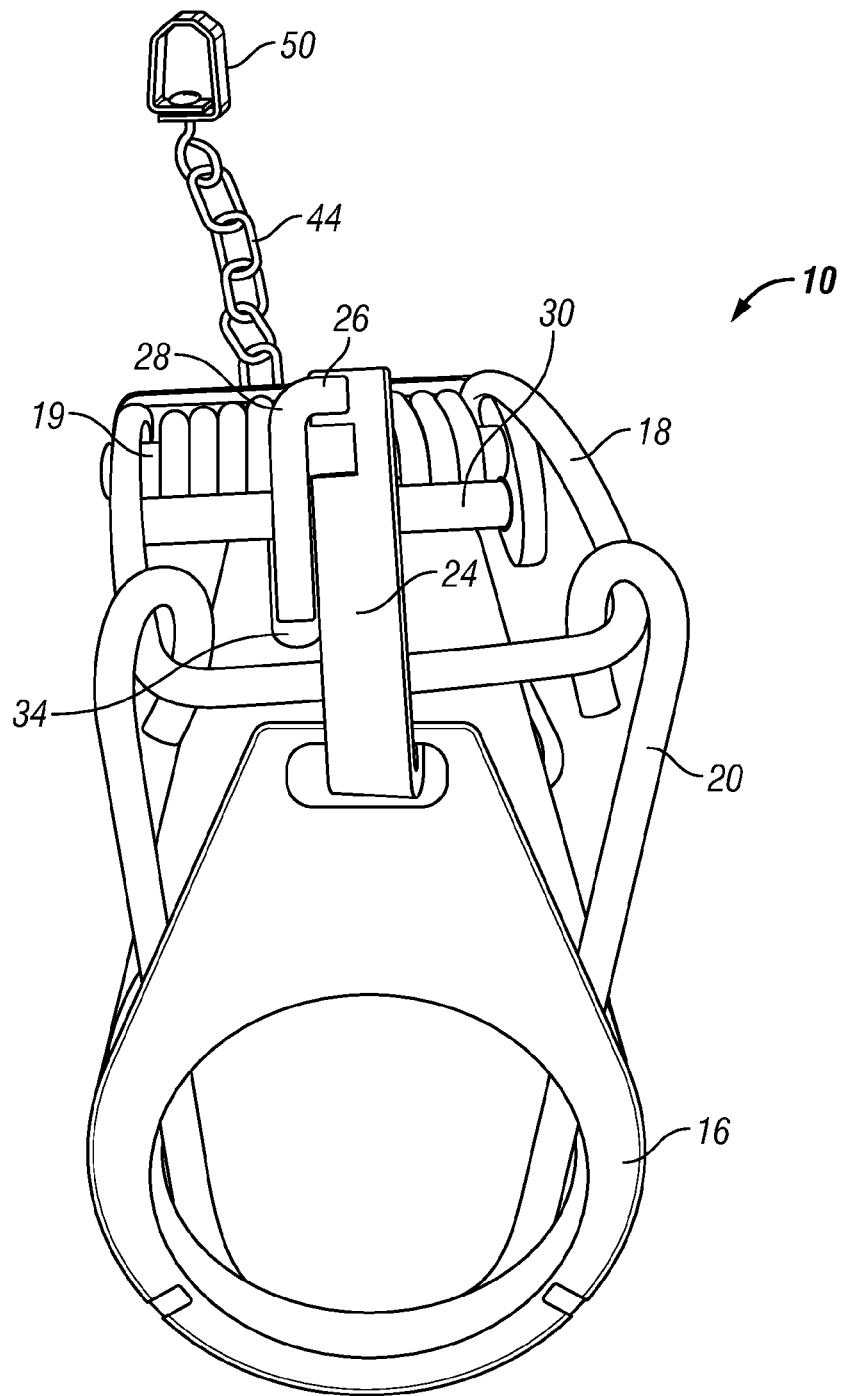
FIG. 5 is a front perspective view showing the trap in a set condition.
Figure 6:
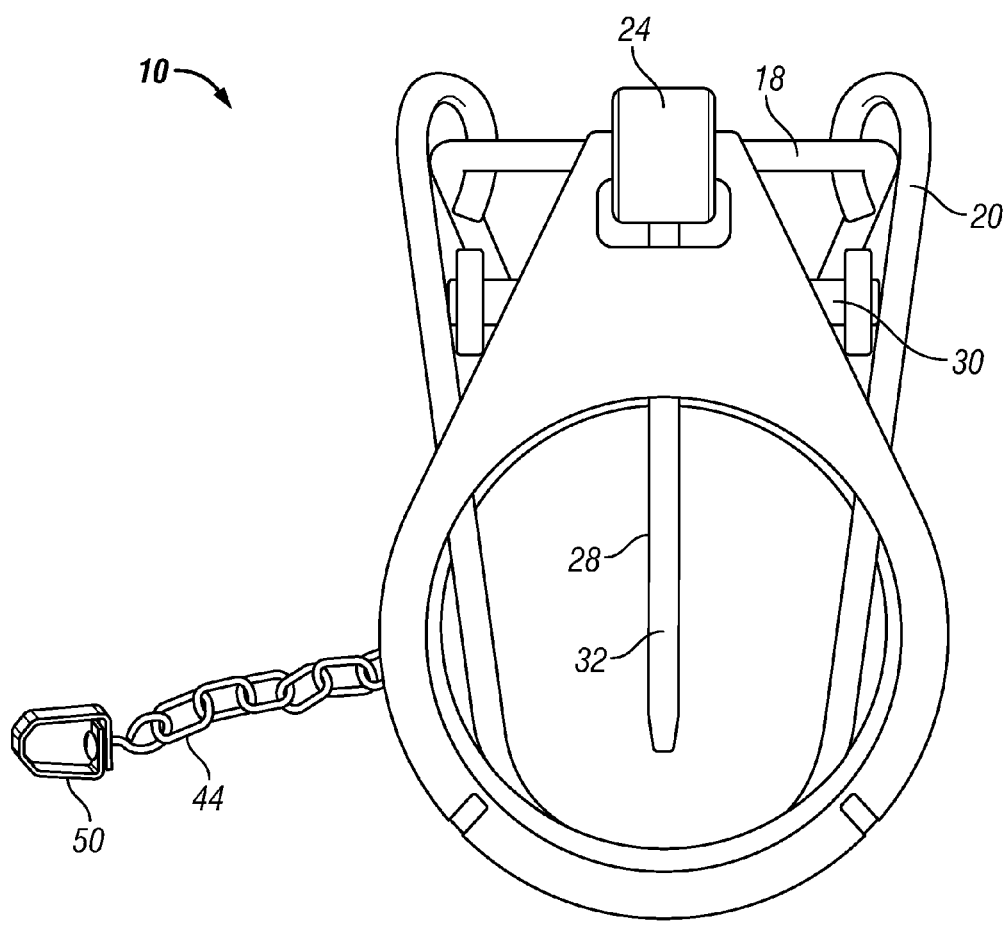
FIG. 6 is a front end view of the trap in a set condition.

The trap 10 of the present invention includes a tubular body or housing 12 which is closed at the rear end 14 and open at the front end 16. The trap 10 includes an animal paw restraint formed by a spring-loaded wire frame 18 with a U-shaped arm loop 20 extending through a pair slots 22 at the forward end 16 of the tube 12 so that the lower end of the arm 20 is movable across the diameter of the tube. The wire frame 18 is pivotally mounted on an axle 19 at the rear end 14 of the tube 12, such that the arm 20 is movable between an unset or open position seen in FIGS. 3 and 6 and a set or closed position shown in FIGS. 1 and 2. A spring 21 on the housing 12 biases the wire frame 18 to the released position. An elongated latch 24 is pivotally mounted adjacent the front end 16 of the tubular housing 12 so as to be movable between a first position engaging the wire frame 18 to hold the wire frame 18 and arm 20 in the set position, and a second position disengaged from the wire frame 18 so as to release the frame 18 and arm 20 from the set position. In the set position, the latch 24 overlies the wire frame 18 and is secured by a hook 26 on the upper end of the trigger 28 of the trap 10. The trigger 28 is pivotally mounted on a cross bar 30 on the outside of the housing 12 and includes a leg 32 extending into the housing 12 through a slot 34 in the housing 12. As best seen in FIGS. 4 and 5, the hook 26 on the upper end of the trigger 28 extends laterally and overlies the rear end or tip of the latch 24, and thereby prevents the latch 24 from disengaging the wire frame 18, and thereby maintaining the wire frame 18 and arm 20 in the set position.

Figure 7:
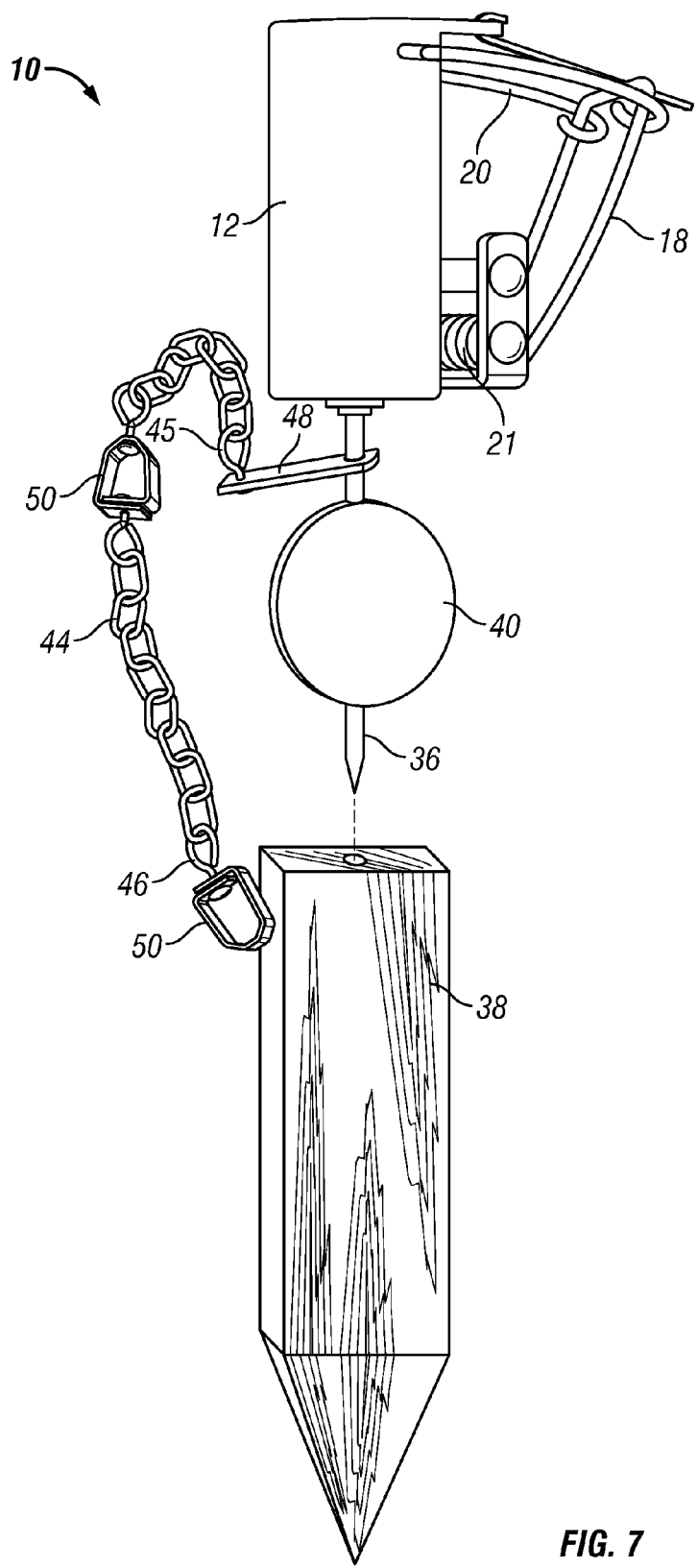
FIG. 7 is an exploded view showing a preferred embodiment for the trap anchor.

The preferred form of a trap anchor is shown in FIG. 7 wherein the anchor is formed by a ¼" cold rolled steel stake 36 having a sharp point on the end which can be pushed into hard or frozen ground, and can be nailed or pushed into a tree, bridge piling, or other solid structure. As further shown in FIG. 7, the pointed steel stake 36 can be attached to a longer wooden stake 38 with a hole in the top end to receive the steel stake 36. Thus, the wooden stake 38 extends the length of the trap anchor 36 so that the trap 10 can be used in water, such as a creek or river, with the wooden stake 38 being pushed into the creek or river bed, with the housing 12 residing above the water so that the bait in the housing does not get wet. As further shown in FIG. 7, a round washer or plate 40 is welded to the steel stake 36 so as to keep the trap 10 stable, and prevent turning or rotation of the trap 10 when the anchor 36 is set in sand, mud or loose dirt.

Figure 1:
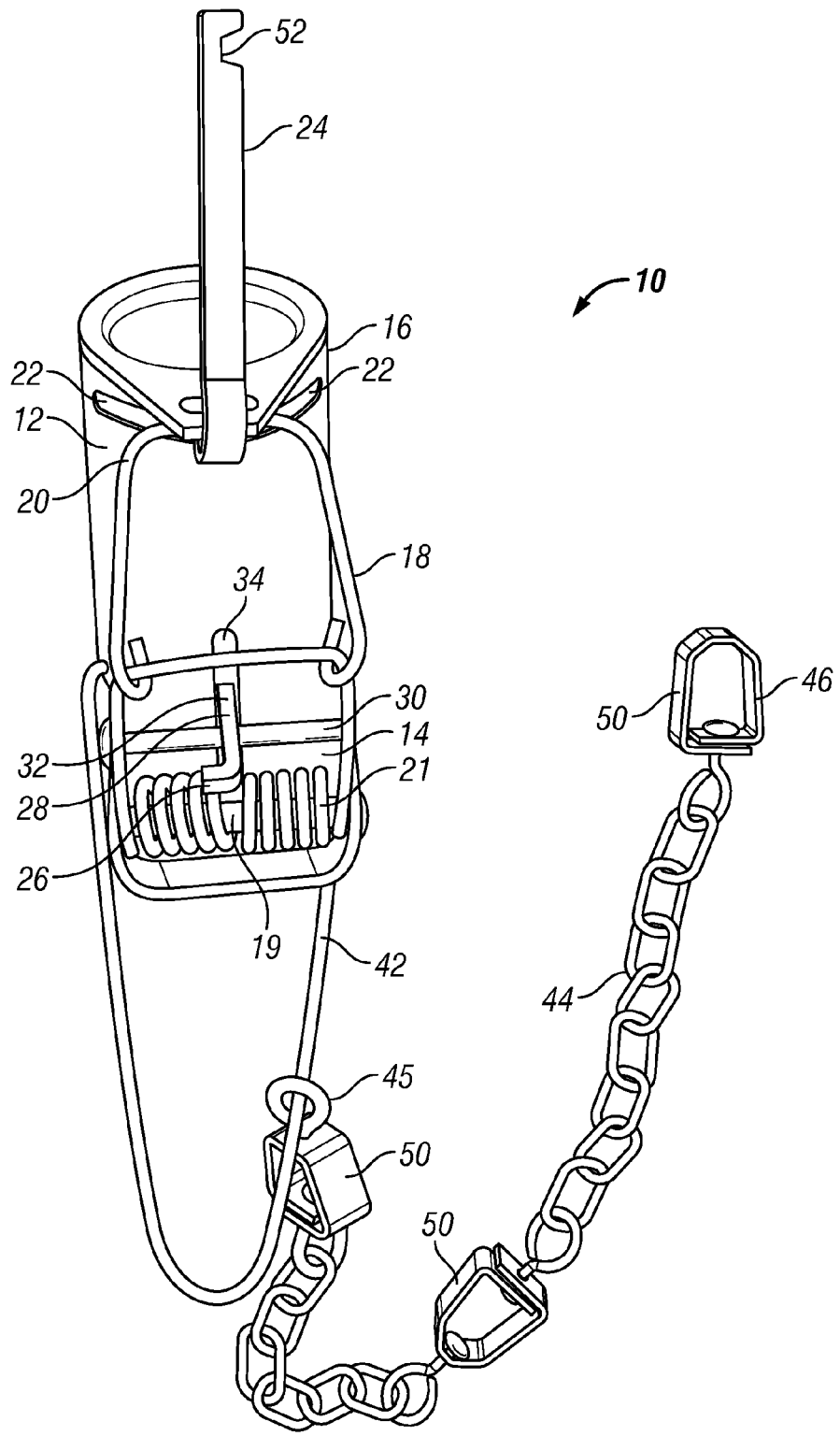
FIG. 1 is an upper perspective view of the animal trap of the present invention in a released or unset condition.
Figure 2:
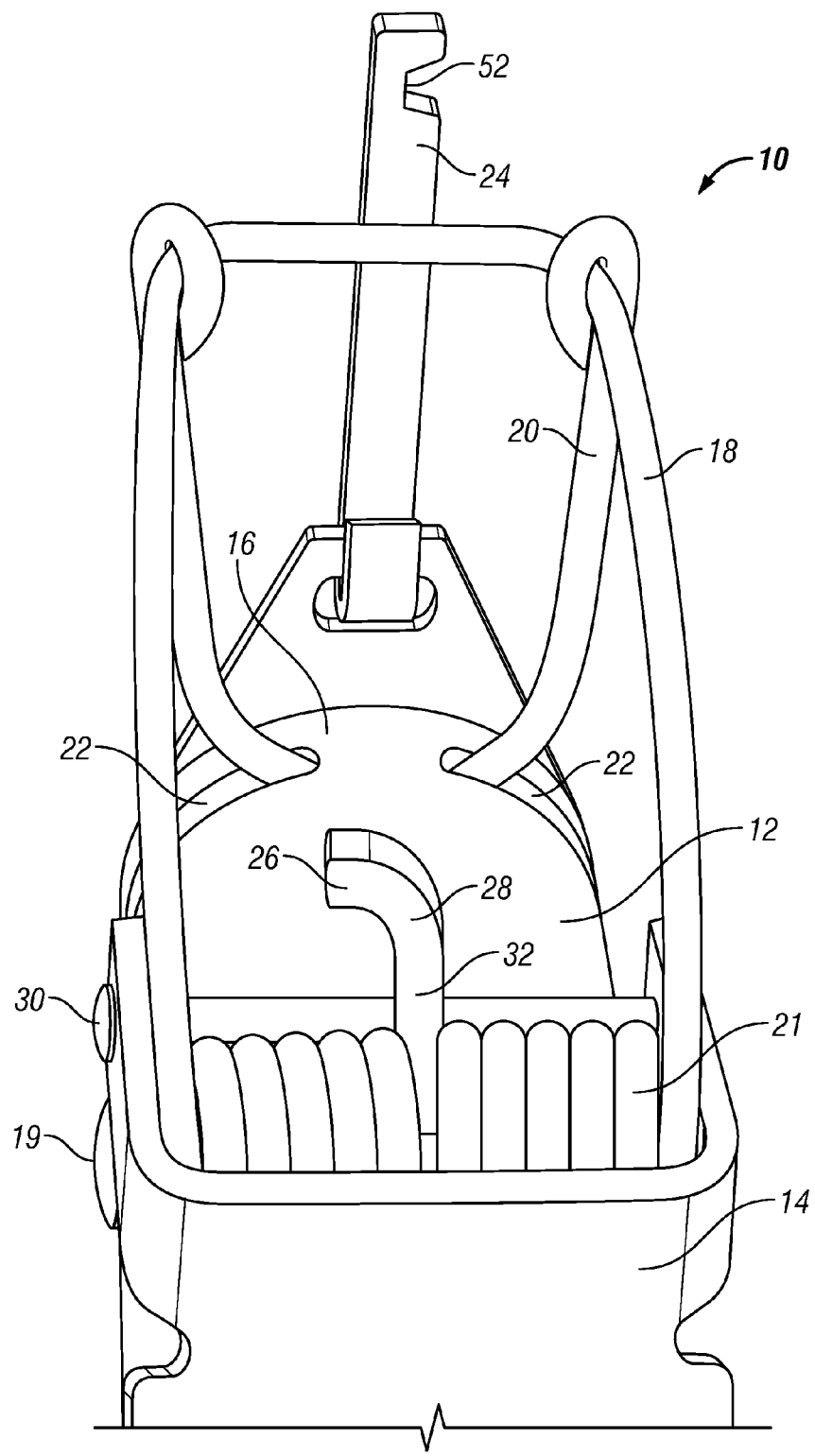
FIG. 2 is an enlarged view of the upper catch end of the trigger of the trap.
Figure 3:
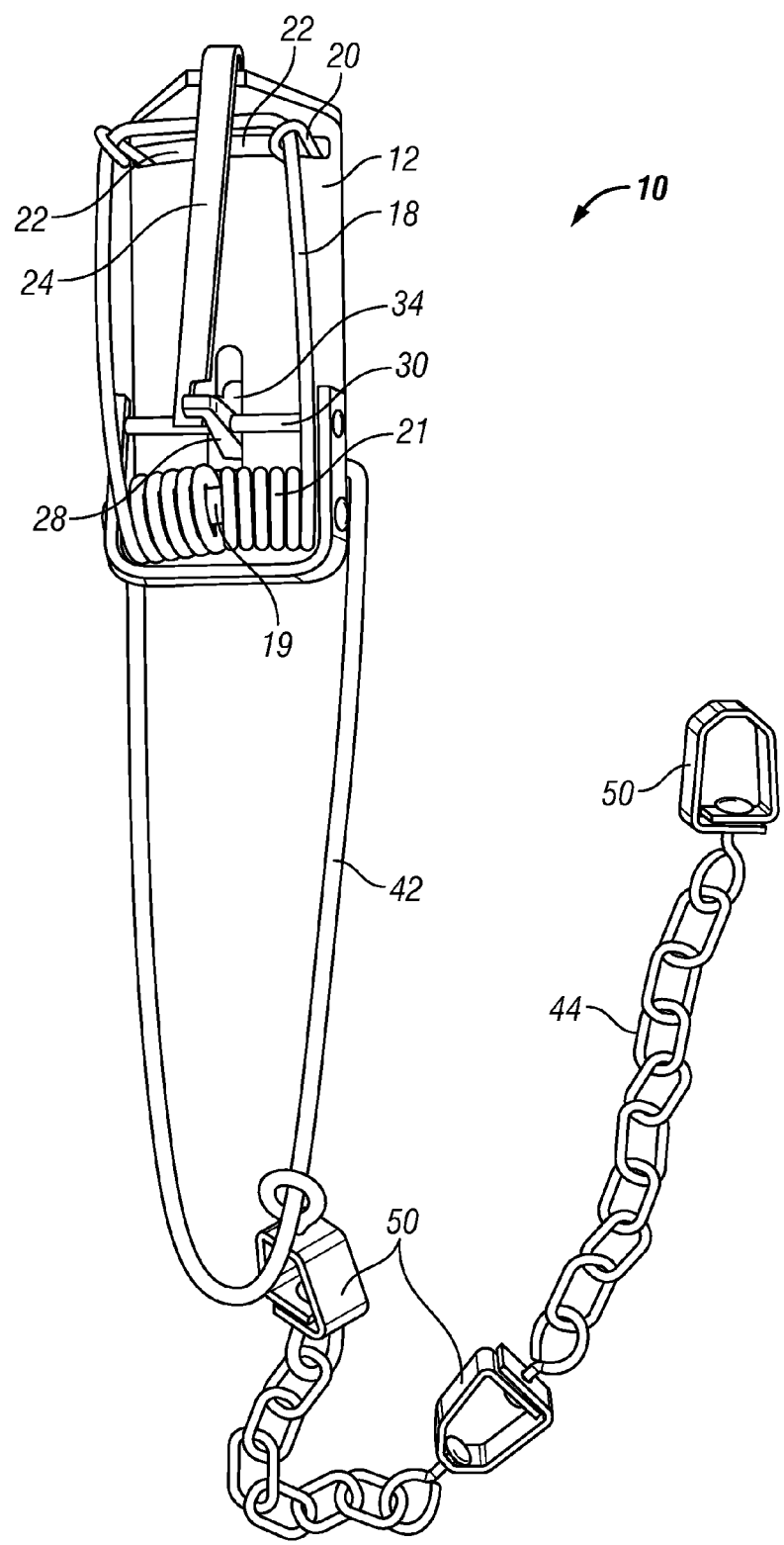
FIG. 3 is a top plan view of the animal trap of the present invention in a set condition.

As shown in FIGS. 1 and 3, an alternative anchor for the housing 12 is in the form of a U-shaped wire-type anchor 42 at the rear end 14 which is pushed into the ground and then rotated 90° to retain the trap 10 in the ground. Another form of the anchor is a rod (not shown) welded to the tubular housing and extending downwardly, with a wire or plate member at the lower end to prevent rotation of the trap. The plate may be any shape, such as an inverted triangle, which facilitates insertion into the ground.

A chain 44 is connected to the anchor 36, 42 with the opposite free end 46 staked to the ground or other object to further secure the trap 10 against movement by an animal caught in the trap 10. The round or curved perimeter edge of the washer or plate 40 on the stake 36 prevents the chain 44 from becoming tangled or caught on the stake 36. Once an animal is caught in the trap 10, it is desired that the animal be able to pull the stabilizing stake 36, 42 out of the ground or wood, but still be controlled by the anchor at the far end 46 of the chain 44. The goal is to keep the trapped animal as comfortable as possible. With this type of leg trap 10, and without chain entanglement, the raccoon may even be found sleeping with the trap 10 on its foot when the trap is checked by the trapper.

The first end 45 of the chain 44 is preferably connected to the trap 10 via a flat steel bar 48 which freely rotates on the steel stake 36 above the plate 40. The first end 45 of the chain 44 is riveted or connected to the bar 48 for rotation. The chain 44 may include multiple sections connected by a swivel 50, as well as a swivel 50 at the second end 46 of the chain 44. Thus, there are multiple pivot or swivel points between the trap anchor 36, 42 and the far end 46 of the chain 44 to preclude twisting or entanglement of the chain 44.

In use, bait, such as a marshmallow, candy or other sweetened food can be inserted into the tubular housing 12 behind the trigger 28 before the trap 10 is set. The bait may also be very small pieces or a liquid which can be poured into the housing after the trap 10 is anchored and the trap is set. After the trap 10 is set, the anchor 36, 42 can be pushed into the ground. When the animal, such as a raccoon, reaches its paw into the trap 10 to get the bait, if the trigger leg 32 is pushed rearwardly by the raccoon's paw, the hook 26 on the upper end will move or pivot forwardly and disengage the latch 24 via a notch 52 in the latch 24, as seen in FIG. 4. Alternatively, if the raccoon's paw gets behind the trigger leg 32 and then pulls the leg 32 forwardly, the hook 26 at the upper end of the trigger 28 will pivot rearwardly and disengage the end of the latch 24. When the trigger hook 26 disengages the latch 24, the spring 21 quickly forces the wire frame 18 upwardly, thereby pulling the wire arm 20 toward the closed position and trapping engagement with the raccoon's leg, so that the raccoon cannot escape from the trap 10.

Thus, the two-way acting trigger 28 can be moved both forwardly and rearwardly by the animal's paw to disengage the latch 24 and trip the trap 10 so as to catch the raccoon in the trap 10. The anchor chain 44 of the trap 10 holds the trap 10 until the trapper returns.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An animal trap, comprising:
a tubular housing with a closed rearward end, an open forward end into which an animal can reach its paw, and a longitudinal central axis;
a spring loaded restraint mounted on the housing and movable between set and unset positions;
a latch pivotally mounted on the housing movable between set and unset positions;
a trigger pivotally mounted on the housing and extending into the housing;
the restraint being moved to the set position extending into the housing and the latch being moved to the set position for engagement by the trigger to maintain the latch and the restraint in the set positions;
the trigger being movable by the animal's paw to disengage the trigger from the latch, and thereby release the latch and the restraint from the set positions, whereby the paw is caught in the housing by the restraint;
a first stake extending downwardly from a center point of the housing and along the central axis of the housing, the stake being configured for insertion into the ground by a trapper to anchor the trap and for pulling from the ground by a trapped animal;
the first stake terminating in a pointed tip; and
an enlarged stabilizer plate mounted directly to the stake between the tip and the housing so that a portion of the plate resides above a mid-point of the stake to preclude rotation and tipping, of the stake when anchored.

2. The animal trap of claim 1 further comprising a second stake insertable into the ground and the first stake being removably coupled to the second stake.

3. The animal trap of claim 1 wherein the latch includes a notch to release the trigger when the trigger is pushed rearwardly by the animal's paw.

4. The animal trap of claim 3 wherein the trigger has an upper end with a hook to retentively, yet releasably, engage the latch, and the hook being adjacent the notch when the trigger engages the latch.

5. The animal trap of claim 4 wherein the notch is adjacent an end of the latch, such that the hook will release through the notch if the paw pushes the trigger and will release over the end of the latch if the paw pulls the trigger.

6. The animal trip of claim 1 further comprising a flat plate rotatably mounted on the stake and a chain having a first end connected to the bar and a second end for further anchoring the housing.

7. The animal trap of claim 1 wherein the stabilizer plate has a width approximately equal to the diameter of the housing.

8. An animal trap, comprising:
a tubular body with a closed rearward end and an open forward end into which an animal can reach its paw;
a spring loaded restraint mounted on the body movable between open and closed positions;
a latch on the body to selectively engage the restraint;
a trigger on the body to engage the latch so as to hold the restraint in the open position; and
the trigger being movable by an animal reaching its paw into the housing and thereby disengaging the latch so as to release the restraint from the open position to the closed position to catch the animal's paw in the body;
a first ground stake having an entirely non-threaded pointed tip configured for insertion into the ground by a trapper to anchor the body to the ground in an upright position and for pulling from the ground by a trapped animal; and
a second ground stake having a pointed tip for insertion into the ground and an upper end with a non-threaded hole for removable sliding receipt of the tip of the first ground stake so as to support the body in an upright position over the second stake.

9. The trap of claim 8 wherein the first ground stake has a plate to preclude tipping and rotation of the body when the first ground stake is inserted into the ground.

10. The trap of claim 8 wherein the latch includes a notch to release the trigger when the trigger is pushed rearwardly by the animal's paw.

11. The trap of claim 10 wherein the trigger includes a hook to retentively and releasably engage the latch, and whereby the hook releases over an end of the latch when the trigger is pulled and releases through the notch when the trigger is pushed.

12. The animal trap of claim 8 further comprising a plate on the first stake to preclude rotation after the first stake is inserted into the ground.

13. The animal trap of claim 8 further comprising first and second chain segments each having a plurality of chain links, and a swivel member connected between adjacent ends of the chain segments, and the first chain segment being connected to the stake and the second chain segment having a free end for connection to a solid structure.

14. The animal trip of claim 8 farther comprising a flat plate rotatably mounted on the stake and a chain having a first end connected to the bar and a second end for anchoring the housing to an object spaced from the housing.

15. A live trap for catching an animal, comprising:
    a housing;
    a latch on the housing;
    a restraint on the housing;
    a trigger on the housing;
    the latch being engageable with the restraint and the trigger being engageable with the latch to hold the trap in a set position; and
    the trigger being movable by the animal to disengage the latch and thereby release the restraint from the set position to catch the animal's paw;
    a ground stake extending from a center point of the housing and along a central axis of the housing, and having a lower tip for insertion into the ground to anchor the trap; and
    a flat plate rotatably mounted ort the stake and having an outer and extending beyond the housing, the outer end having a width greater than the diameter of the stake; and
    a chain having a first end connected to the bar and a second end for anchoring the housing at a point remote from the housing.

16. The live trap of claim 15 wherein the trigger is pivotally mounted on the housing and has a lower end extending into the housing and an upper end engageable with the latch.

17. The live trap of claim 15 wherein the latch is pivotally mounted on the housing for movement between engaged and disengaged positions with the trigger.

18. The live trap of claim 15 wherein the restraint is pivotally mounted on the housing for movement between set and unset positions.

19. The trap of claim 15 wherein the trigger includes a hook to retentively and releasably engage the latch, and whereby the hook releases over an end of the latch when the trigger is pulled and releases through a notch in the latch when the trigger is pushed.

\* \* \* \* \*